S. L. J. HUBBART.
HOOF SPREADER.
APPLICATION FILED SEPT. 8, 1914.
1,180,400.
Patented Apr. 25, 1916.
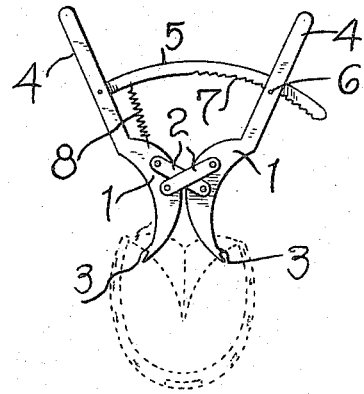
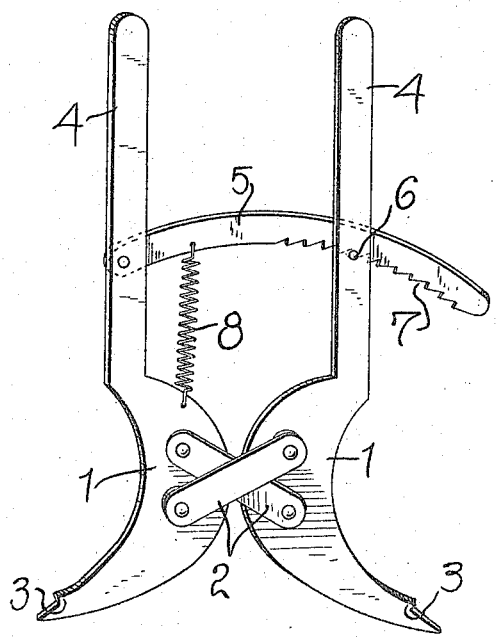
Witnesses
Robert M. Sutphen
V. J. Wowrick
Inventor
S. L. J. HUBBART
By Watson E. Coleman
Attorney

UNITED STATES PATENT OFFICE.

SAMUEL L. J. HUBBART, OF SADORUS, ILLINOIS.

HOOF-SPREADER.

1,180,400.

Specification of Letters Patent.

Patented Apr. 25, 1916.

Application filed September 8, 1914. Serial No. 860,758.

*To all whom it may concern:*

Be it known that I, SAMUEL L. J. HUBBART, a citizen of the United States, residing at Sadorus, in the county of Champaign and State of Illinois, have invented certain new and useful Improvements in Hoof-Spreaders, of which the following is a specification, reference being had to the accompanying drawings.

This invention relates to new and useful improvements in a blacksmith's tool, and particularly to that class of tools generally designated as hoof spreaders.

An object of this invention is the provision of a hoof spreader by means of which the hoof of an animal may be spread, to the desired size, the spreader being extremely simple in construction, and durable and efficient in use.

Another object of this invention is the provision of a hoof spreader which consists of a pair of jaws pivotally connected together and adapted for engagement with the hoof to spread the same, means being provided to automatically lock the jaws in their spread positions, before the shoe is secured to the hoof.

With these and other objects in view, my invention consists in the novel construction, combination, and arrangement of parts, to be hereinafter more fully described, claimed, and illustrated in the accompanying drawing, in which—

Figure 1 is an elevational view of the spreader showing the same in use; and Fig. 2 is a perspective view of the spreader.

Referring more particularly to the drawing, the numeral 1 designates a pair of concavo-convex jaws which are arranged with their convex surfaces opposed to each other, and are pivotally connected together by crossed links 2. It will be noted that by crossing the connecting links 2 it will provide for greater strength than if the links were arranged transversely across the space between the opposed jaws 1. The operative or pointed outer ends of the jaws are disposed in opposite directions, and are provided on their outer faces with sharpened lugs 3 which are adapted to engage the hoof of an animal. Extending from the inner end of each jaw is a handle 4, and pivotally connected to one of the handles is a rack bar 5, a pin 6 being connected to the other handle, and the rack teeth 7 of the bar 5 being adapted to engage the pin 6 to hold the jaws in adjusted position. To normally maintain the rack bar in engagement with the pin 6, a spring 8 is provided, which is connected at one end to the rack bar and at its other end to one of the jaws, whereby movement of the handles to draw the jaws toward each other is normally prevented.

In the practical use of my device, the rack bar is disengaged from the pin 6 against the tension of the spring 8, and the handles 4 are spread to move the ends of the jaws inwardly toward each other, so that the same may be engaged between the branches of the frog of the hoof of the animal. With the jaws in this position, the rack bar 5 is released so that the spring will draw the same against the pin 6 whereupon the handles 4 are moved inwardly toward each other to spread the points of the jaws, the same engaging in the branches of the frog to spread the same the desired distance, the lugs 3 limiting the inward movement of the pointed ends of the jaws, and the rack bar 5 engaging with the pin 6 preventing disengagement of the jaws from the hoof. When the shoe is applied to the hoof, the shoe holds the hoof in its spread position, and the rack bar may then be disengaged from the pin 6 so that the jaws may be disengaged from the branches of the frog and removed from the hoof of the animal.

From the above description taken in connection with the accompanying drawing, it will be seen that I have provided a hoof spreader by means of which the hoof may be spread to the desired size, the spreader being automatically locked in its spread position and being quickly unlocked and disengaged from the hoof so that the same may be connected to another hoof to spread the same.

Having thus fully described my invention, what I desire to claim and secure by Letters Patent is:—

A hoof spreader consisting of a pair of oppositely curved jaws, handle members carried by adjacent ends of said jaws, cross links positioned at one side of and pivotally connecting said jaws, an arcuate rack bar having one end pivotally connected to one of the handles, a pin carried by the opposite handle adapted to be engaged by the rack bar to retain the handles in relative adjusted positions, a coil spring having one end secured to the rack bar and its other end secured to one of the jaws to normally retain said rack bar in engagement with the pin, the outer ends of the jaws being directed oppositely and pointed, and lugs formed on the outer edges of said jaws rearwardly of and in close proximity to the pointed ends of said jaws.

In testimony whereof I hereunto affix my signature in the presence of two witnesses.

SAMUEL L. J. HUBBART.

Witnesses:
A. M. CATHCART,
J. B. DILLON.

Copies of this patent may be obtained for five cents each, by addressing the "Commissioner of Patents, Washington, D. C."